March 16, 1943.   R. C. HANFORD   2,314,275
WORK SCHEDULING MEANS
Filed Aug. 10, 1939   2 Sheets-Sheet 1

FIG. 1

INVENTOR.
RAYMOND C. HANFORD
BY
Kuis Hudson & Kent
ATTORNEYS

March 16, 1943.  R. C. HANFORD  2,314,275
WORK SCHEDULING MEANS
Filed Aug. 10, 1939  2 Sheets-Sheet 2
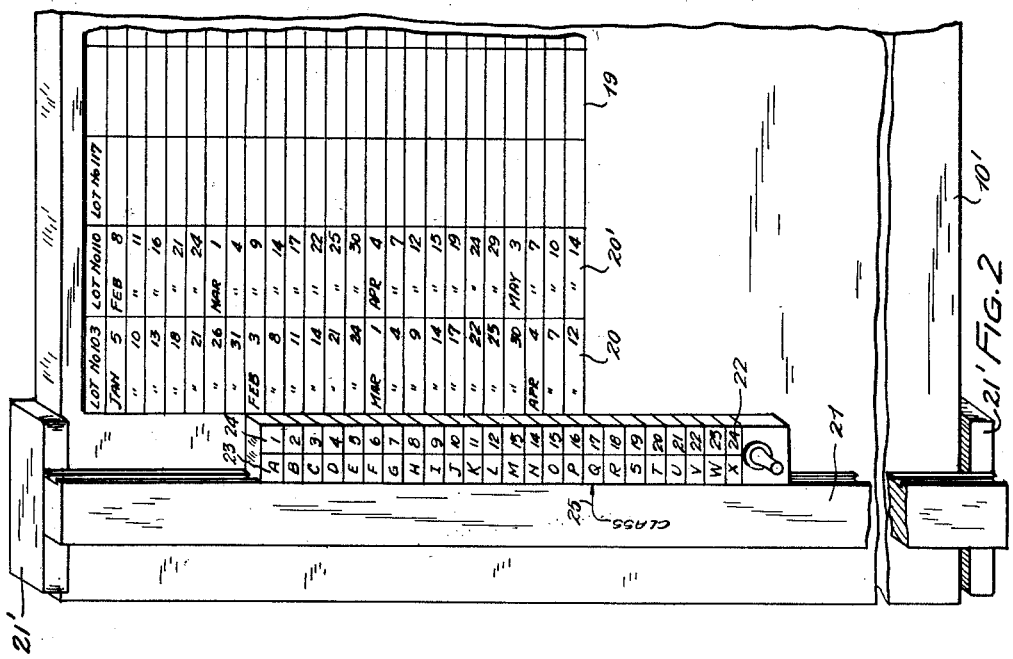
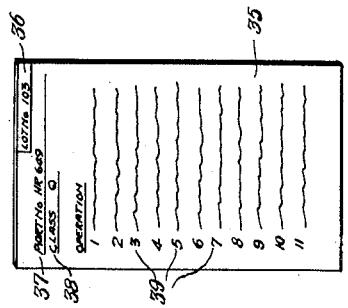
FIG. 3.
INVENTOR.
RAYMOND C. HANFORD
BY
Kwis Hudson & Kent
ATTORNEYS

UNITED STATES PATENT OFFICE 2,314,275

WORK SCHEDULING MEANS

Raymond C. Hanford, Aurora, Ohio

Application August 10, 1939, Serial No. 289,457

1 Claim. (Cl. 35—24)

This invention relates to improvements in work scheduling means, and comprises means of this character intended primarily for use in the manufacturing departments of a manufacturing plant, especially plants engaged in the manufacture of machines or other products in which a large number of parts are incorporated.

In order to promote the greatest efficiency, prevent unnecessarily large in-process inventory in some instances, and a dearth of material in others, and to enable the management and the sales organization to know with a fair degree of accuracy when deliveries upon given products may be made, an effective planning and scheduling of work in the manufacture and assembly of the parts must be employed. The means of the present invention in connection with proper identification of the parts in the orders given to a foreman enables such foreman to determine readily when each operation upon a given set of parts must be completed in order to maintain the schedule.

In carrying out the invention the operations to be performed in the manufacture of a given set or "lot" of parts or work pieces are divided into a series of classes each of which is divided into a series of subclasses, and each operation is identified by suitable symbols to indicate the particular class and subclass to which it belongs. One series of symbols is used for classes and another for subclasses, or if desired a single series of symbols, such as the numerical series 1, 2, 3, etc., may be applied both to classes and subclasses. In either case each operation to be performed is identified with one class and with one subclass of that class by means of two characteristics, namely, the corresponding class symbol and subclass symbol. Thus a class may consist of all operations to be performed on a given group of parts or work pieces and a subclass may consist of all similarly identified operations on the work pieces of that group. In accordance with the preferred method of carrying out the invention I put in a given class all parts the work upon which is scheduled to begin on a given date.

When a foreman receives in his department a part or a number of identical parts upon which certain operations are to be performed in that department, he commonly also receives a "shop rider," such as a card, envelope, or other printed form, which bears the engineering part number or other identification of the parts concerned and which also bears a list of the operations to be performed thereon. In carrying out the present invention such rider also bears one of the class symbols above referred to and, adjacent each operation, one of the subclass symbols. Thus each operation listed on the rider is identifiable as to its particular class and subclass. The chart forming the subject of the invention is employed in determining from this information alone when each operation is to be performed.

The principal object of the invention therefore is the provision of simple and readily understandable means for listing the operations to be performed upon the various parts or items of a given set or lot of parts entering into a product and the dates or times when such operations are to be performed.

Other objects and features of novelty will appear as I proceed with the description of those embodiments of the invention which, for the purposes of the present application, I have illustrated in the accompanying drawings, in which Fig. 1 is a perspective view of a chart embodying the invention.

Fig. 2 is a similar view of a modified form, and

Fig. 3 is a plan view of a shop rider which which may be used in connection with the invention.

Referring first to Fig. 1 of the drawings, a rectangular board which forms a support for the other elements of the device is indicated at 10. To this board there is attached a printed sheet 11 divided by vertical lines 12 and horizontal lines 13 into rectangular spaces. In each of the spaces of the diagonal row extending from the upper lefthand corner to the lower righthand corner there is printed a symbol indicating a first operation. As illustrated I preferably use the numeral 1, although obviously some other symbol of a known series, as for example the letter *a*, could be employed if desired. In all of the spaces of the next lower diagonal row the symbol 2 is printed. In the spaces of the next row the symbol 3, etc., until all of the spaces within that triangle are filled. These are the subclass symbols of the chart.

The vertical columns of symbols on this chart may be said to represent classes of operations and the class represented by each vertical column may be identified by the largest number of that column, in other words the numbers printed in the lowermost horizontal row 14. In that case an operation would be identified by two numbers, as for instance 12—7, which would bered 7 in the column containing twelve spaces and bearing the number 12 at the bottom. As shown however I print a row of letters 15 at the bottom of the chart and identify a particular space by a letter and number, in which case the space above referred to would be the space identified as L—7.

Now, alongside the sheet 11 I mount on the board one or more date scales 16, 16' etc. Such scale members are made up for each lot of parts to be manufactured and show the period over which the work on a given lot is to be spread, and in connection with the class and subclass indications above referred to they show the dates when particular operations must be completed. The horizontal divisions of each date scale correspond in dimension with the spacing of the lines 13 of sheet 11, so that the date entries may be lined up in register with the horizontal rows of spaces of the chart. These date scale members are removable and replaceable and may be adjusted lengthwise if desired either individually or collectively so as to change the schedule for any given lot or for all lots should such change or changes become necessary or desirable. In most cases however it is best to print a new scale or set of scales and substitute the same for the discarded scale or scales. Preferably a new set of scales is printed on a single sheet to be substituted for the scales previously in use, so as to reduce to a minimum the risk that an occasional scale in some department may be incorrectly positioned. It is to be noted that my invention permits the use of identical scales in all of the departments of a plant.

In order to facilitate the reading of the symbols and their corresponding dates, I preferably provide a straight edge member 17 upon which is mounted a horizontal row of class symbols 18 corresponding to the row 15. This straight edge member is so guided by means of end pieces 17' engaging the side edges of board 10 as to move parallel to itself, whereby it may be moved into position directly underneath any horizontal row of spaces on the sheet 11 and corresponding entries in the date scales 16, 16', etc. Thus if a foreman is desirous of knowing when the fifth operation of a class N part in lot 103 is to be performed he pushes the straight edge member 17 upwardly until the letter N thereon comes directly underneath the subclass symbol 5, and follows the straight edge over into date scale 16, reading the date March 4, which is the answer to his question.

In Fig. 2 is shown a modification wherein a board 10' has mounted thereon a removable and replaceable sheet 19 upon which are printed a plurality of date scales 20, 20', etc. While the drawing shows the date scales as on a single sheet, they may be printed on separate strips which are adjustable lengthwise individually. A vertical straight edge member 21 having end pieces 21' is arranged to slide upon the board crosswise thereof so as to be brought into juxtaposition with any one of the date scales. Straight edge member 21 supports a slide bar 22 by suitable means, such as by a dovetail tongue and groove, permitting the slide bar to move parallel to the straight edge and parallel to the date scales. On this slide bar there are printed a vertical column of class symbols 23 and a vertical column of subclass symbols 24. A gauge mark or arrow 25 enables the operator to adjust the slide bar to proper position for reading different classes of work pieces. Each subclass symbol for that class is thereby brought into register with the date scale. Assuming for example that it is desired to know when operation #5 on work pieces of class Q in lot 103 is to be completed the operator moves slide bar 22 vertically until symbol Q comes opposite the arrow 25, and notes that subclass symbol 5 is then in register with the date February 21, which is the answer to his question. If he wants similar information with respect to lot 110 he moves the straight edge over to a position adjacent scale 20' and reads the answer March 25.

In this case if the same series of symbols were to be used for class and subclass, for example if the letter symbols were to be omitted, and the particular operation above referred to were idenfied as 17—5 instead of Q—5, the operator would of course move the slide bar 22 to bring the symbol 17 opposite the arrow, when the answer would be read by noting that the symbol 5 is registered with the date February 21.

It will be observed that what is done in connection with the form of the invention illustrated in Fig. 2 is in effect to use only the longest vertical column on the sheet 11 of Fig. 1 and to move it down to a greater or lesser extent in order to convert it into any one of the other vertical columns of that sheet. It may therefore be said that the row of symbols in column 24 is equivalent to a series of columns ranging progressively from a single symbol to twenty-four symbols.

A shop rider such as previously referred to is illustrated in Fig. 3 at 35. The notation 36 shows the foreman or other person concerned that the date scale to be consulted is scale 16 or 20 as the case may be. Entry 37 is a regular engineering part number showing the number on the detail drawing by which the machinist or other workman is guided in performing the particular operation assigned to him. Entry 38 shows the class symbol. That symbol has no function except in respect to scheduling work, and the group of parts to which it is applied may be formed or selected in any desired suitable manner. For example a class may include all parts, work upon which is to begin on a specified date. Thus the group may include parts which are identical or otherwise and which require the same or different numbers of operations. However, as appears from Fig. 1 a given class should not be used for parts requiring more operations than the number of subclasses into which that class is divided. For example, class Q might be used for seventeen operation parts or for parts requiring any number of operations less than seventeen, but should not be used for parts requiring more than seventeen operations. Parts may be classed however upon some quite different basis if desired, as for instance upon the basis of parts made from castings, forgings, bar stock, etc., or even according to a purely arbitrary scheme, depending upon convenience in planning the work preparatory to making up the date scales. The subclass symbols are shown on the shop rider at 39. They are arranged in the order in which the operations are to be performed, and opposite each symbol there may be printed a description of the operation and if desired the department number in which the operation is to be carried out.

The length of the series of symbols employed

Having thus described my invention, I claim:

In a device operable to communicate information of the scheduled time of performance of each of a multiple of work operations entering into a plurality of sets or lots of work, the operations entering into each set or lot being classifiable into classes and subclasses, a support, means mounted thereon bearing a plurality of series of equal graduations adapted to constitute time scales, said series of graduations being arranged side by side, one for each lot of ing appropriate designations marking off spaces corresponding in depth to said graduations and arranged in columnar form from which may be selected any one of a a plurality of columns of different length representing classes for registration with the corresponding graduations of the different series, said spaces carrying therein sub-class indicia, whereby the time of performance for any subclass operation of any lot of work may be ascertained.

RAYMOND C. HANFORD.